Feb. 26, 1929.  
J. L. GRAY ET AL  
1,703,232  
METHOD OF MAKING HARD SHELL PUMP  
ROD COUPLINGS AND THE LIKE  
Original Filed Aug. 18, 1926
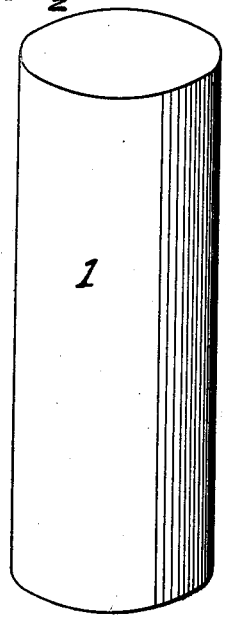
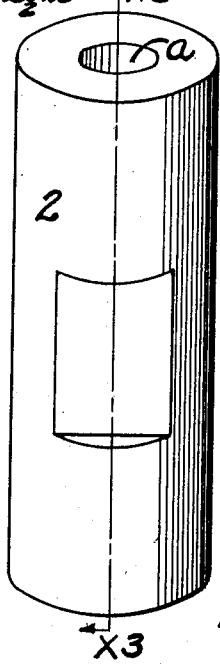
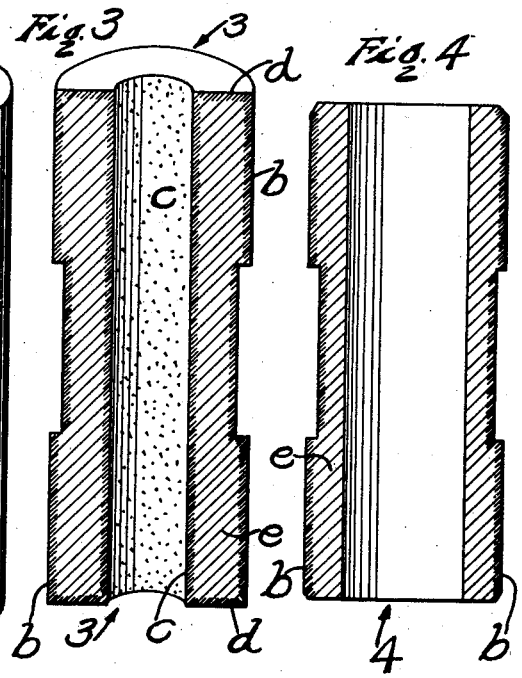
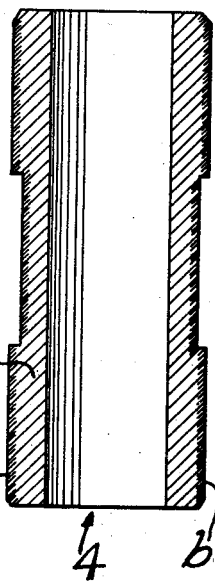
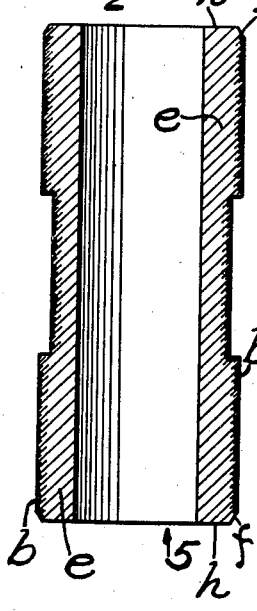
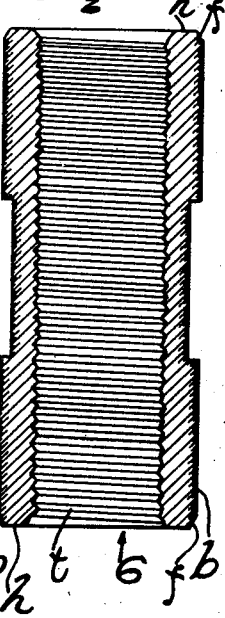
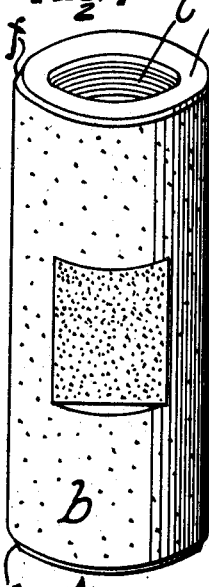
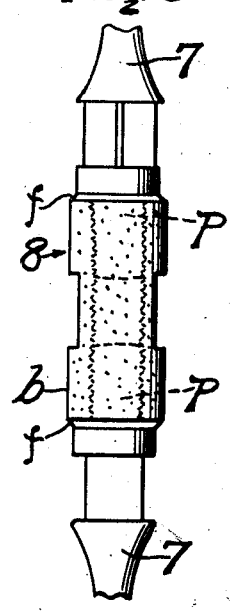
INVENTORS  
JESSE L. GRAY  
ROBERT W. GUNN  
WILLSIE A. S. THOMPSON Patented Feb. 26, 1929.

1,703,232

UNITED STATES PATENT OFFICE.

JESSE L. GRAY, ROBERT W. GUNN, AND WILLSIE A. S. THOMPSON, OF LOS ANGELES, CALIFORNIA, ASSIGNORS, BY MESNE ASSIGNMENTS, TO EMSCO DERRICK & EQUIPMENT COMPANY, OF LOS ANGELES, CALIFORNIA, A CORPORATION OF CALIFORNIA.

METHOD OF MAKING HARD-SHELL PUMP-ROD COUPLINGS AND THE LIKE.

Original application filed August 18, 1926, Serial No. 129,974. Divided and this application filed October 17, 1927. Serial No. 226,770.

This invention more particularly relates to a novel method for making couplings for the sections of sucker rods for deep well pumps, and which is adapted for the manufacture of couplings for pipe, cable ends, piston rods, shafts and turnbuckles and the like. This application is a division of our application entitled Hard shell pump-rod coupling, Serial No. 129,974, filed August 18, 1926.

Where oil wells are sunk to great depth, sometimes exceeding five thousand feet, it is customary to pump oil out of such wells through pump tubes having foot valves; suckers being operated in the tuber for that purpose by means of rods which are made in sections joined by couplings, each rod extending from near the bottom of its pump tube to above the surface of the ground.

The rod sections and their couplings are required to be of great strength and to be connected with great force so that they will not unscrew or part, and they are subject to great wear through coming into contact with the interior of their tubes as they are reciprocated up and down in the operation of pumping. Such rods of coupled sections are necessarily made of strong tough steel.

An object of this invention is to provide a method of manufacturing pump-rod section couplings or other couplings having superior wearing qualities, and yet being strong and tenacious and not likely to break nor wear.

It is desirable particularly in pump-rod couplings that the same shall have absolutely true interior threads to exactly fit the threads on the sucker rod sections and it is also desirable that the couplings have a hard and polished exterior so that they will not cause friction, will not become worn, and will not wear the tubing excessively.

An object of this invention is to make a pump-rod coupling having these important and valuable features.

Attempts have heretofore been made to provide sucker rod couplings having hard wearing surfaces, but in order to provide the coupling with a hard surface it is necessary to heat the coupling steel to a requisite heat and then quench the heat to give the steel a hardened surface; but it is found that if the thread is cut in the bore of the coupling piece before the metal is case-hardened such threads become distorted so that in screwing the couplings home on the rod sections there is likelihood of stripping or wrecking the threads in parts, thus making the rod likely to pull apart under the tremendous weight of the rod and the column of liquid it has to lift; and it has been found impracticable to use a coupling of this character in which the threads are cut into the hardened inside shell.

This invention is broadly new, basic and pioneer in that it provides a method for manufacturing tubular couplings having a case-hardened shell and a threaded soft tough steel inside wall and also includes a blank from which said coupling is made, said blank comprising a case-hardened shell and soft steel interior wall.

The advantage of the improved coupling is that the same can be internally threaded without distortion so as to screw onto the threaded ends of the sections to which it is connected.

When the blank is tapped and the ends of the blank are externally bevelled, the coupling is perfected.

We have discovered that by first carbonizing the surface of a tube, then boring out the carbonized surface inside the tube and trimming the ends of the tube so as to leave a central tubular body of non-carbonized stock exposed at the ends and at the surface of the bore, then hardening the carbonized surface and then tapping the bore, it is possible to make a coupling externally hard and internally tough and screw-threaded, adapted to be screwed so tightly onto the threaded pins of the connecting rod sections as to make the rod practically integral from end to end, free from likelihood of unscrewing and from wearing at the joints; and that by polishing the outside of the coupling it is less subject to wear the tubing and to be worn thereby.

An object is to provide a novel method of manufacturing a coupling that will carry a high exterior polish so as to operate smoothly with respect to the well tube.

An advantage from the use of a coupling having a hard carbonized peripheral shell and a soft and tough tubular threaded core, having ends projecting beyond the shell, is that by screwing the joint together with great force the soft tough steel threads of the core are practically swaged onto the pins of the rod sections the soft core being condensed endwise within the hard external shell by pressure on said soft steel projecting ends by the collars of the rod sections adjacent the pins.

Other objects, advantages and features of the invention may appear from the accompanying drawing, the subjoined detailed description and the appended claims.

This application is a division of our application for patent on hard shell pump rod coupling and method of and blank for making the same, Serial No. 129,974, filed Aug. 18, 1926; and the discovery and invention may be understood by reference to the accompanying drawing which is a replica of the drawing filed in said application.

Figure 1 is a perspective view of a length of cold rolled steel screw stock of which the coupling is to be made.

Fig. 2 is a like view of such length, bored ready for carbonizing.

Fig. 3 is a perspective view in axial section on line $x^3$, Fig. 2, after carbonizing and before hardening.

Fig. 4 is an axial section of the peripherally carbonized blank after the ends have been turned and the carbonized inside lining has been bored out.

Fig. 5 is an axial section of the trimmed and bored externally case-hardened coupling blank.

Fig. 6 is an axial section of the bored, threaded and trimmed externally case-hardened internally tough rod coupling ready for use.

Fig. 7 is a perspective view of the finished coupling.

Fig. 8 is a fragmental view of the coupling in use connecting two lengths of a pump rod.

A standard size for pump rod couplings is four inches long and one and five-eighths inches in diameter, and the stock from which we prefer to make our improved couplings is in the form of rods of what is commonly known as cold rolled screw stock one and five-eighths inches in diameter. Such stock is soft steel low in carbon.

To produce pump rod couplings of said standard size embodying this invention, we cut such stock into four and one-eighth inch lengths such as shown at 1 in Fig. 1; the same being one-eighth inch longer than is required for the proposed standard rod coupling.

Each cut or length 1, is drilled with a central bore $a$ five-eighths inch in diameter, thus leaving a tubular body 2 that is one-half inch thick all around outside the bore $a$.

The tubular screw stock length 2 thus formed, is then carbonized by enveloping the same in a case-hardening substance such as bone meal, illuminating gas, cyanide of potassium or any well known material, not shown, commonly used for case-hardening; and the same is brought to, and held at, a sufficient heat for a sufficient time to produce a carbonized outside shell $b$, a carbonized inside lining $c$ and carbonized end facings $d$ of steel extending on all surfaces to the depth of about one-sixteenth of an inch, thus producing a superficially carbonized tube 3 having a tough soft steel body $e$ enveloped in a carbonized case $b$, $c$, $d$.

The tube is then cooled and the inside carbonized steel lining $c$ is drilled out as indicated at 4 to a diameter of bore suitable to receive the selected thread, as for instance to a diameter of fifty-seven sixty-fourths inch; fifty-eight sixty-fourths inch; fifty-nine sixty-fourths inch or sixty-one sixty-fourths inch, respectively, for the customary different threading of the coupling rod pins. The end facings $d$ are cut off and the ends are externally chamfered as at $f$ thus forming a coupling blank 5, having a tough soft steel screw stock body $e$ with tough soft steel inside walls and projecting chamfered soft steel ends $h$. Then the coupling blank 5 is heated to a requisite temperature for hardening and is then quenched by immersing in water or other suitable liquid thus producing a hardened coupling blank 5 having a case-hardened steel shell $b$ and a tough soft steel body $e$ and soft steel projecting ends 8.

Then the soft steel inside wall of the hardened coupling blank is tapped to form the coupling 6 having internal threads $t$ to fit the threads of the pins $p$ of the pump rod sections 7 of the common construction indicated in Fig. 8.

In practical assembly, the pump rod, the threaded sucker rod lengths and the couplings are forcibly screwed together with the result that the soft steel ends of the body and the collars of the rod section are compressed or jammed together with the same effect as though the couplings were not provided with the external carbonized and hardened shell; and yet the shell affords superior resistance to wear and is adapted to take on a high polish.

To finally finish the coupling having the case-hardened shell $b$ and the internal tough body and projecting ends, the outside of the coupling is polished and the finished coupling 8 is ready for use. The polishing may be effected by grinding or by any method common to the art.

It is obvious that our improved process is readily adaptable for use in making couplings for pipe, cable, piston rods, shafts, turnbuckles and other mechanical couplings.

It is also understood that although the body of the blank 5 is shown as mainly cylindrical, that tube like blanks or bodies of other external forms may be produced without departing from the spirit of this invention and discovery.

We have determined by exhaustive tests since filing the parent application above referred to, that the polishing of the shell is a very important feature of this invention for the reason that unless the polishing is effected as stated, there remains on the shell a thin skin or outside envelope of slight depth, composed of steel decarbonized by the hardening process, and that if such decarbonized steel is not removed by the polishing process, it acts as a detergent to grind and wear the inside of the pump tubing to a destructive extent and the use of a sucker rod the depths of which are joined by such unpolished couplings, becomes very detrimental, objectionable, and is destructive of the pump tubing in which the rod is operated; but with the polished coupling as above stated, no such wearing results. Such detergent skin may be only one thousandth or two thousandths of an inch thick and yet be very detrimental in use in pump tubing as before stated.

We claim:—

1. The method of making a pump rod coupling set forth which consists in boring a length of soft steel stock, carbonizing the surface of the tube thus formed; removing the carbonized surface inside and at the ends of the tube; hardening the tubular blank thus formed by heating to a requisite temperature; then quenching in water or other suitable liquid and then tapping the bore.

2. The method set forth of making a pump rod coupling which consists in boring a length of soft steel stock, carbonizing the surface of the tube thus formed; removing the carbonized surface inside and at the ends of the tube; hardening the surface of the tubular blank thus formed by heating the same to a requisite temperature and then quenching in water or other suitable liquid, then tapping the bore and grinding the outside surface to form a polished perimeter.

3. The method of making couplings, which consists in boring a length of soft steel stock, carbonizing the surface of the body thus formed, removing the carbonized surface inside the bore and at the ends of the tubular body; hardening the surface of the tubular blank thus formed by heating the same to a requisite temperature, then quenching in water or other suitable liquid and then tapping the bore.

4. The method set forth of making a coupling which consists in boring a length of soft steel stock, carbonizing the surface of the body thus formed; removing the carbonized surface inside and at the ends of the body; hardening the surface of the tubular blank thus formed by heating the same to a requisite temperature and then quenching in water or other suitable liquid, then tapping the bore and grinding the outside surface to form a hardened, polished perimeter.

5. The method set forth of making a coupling which consists in boring a length of soft steel stock; carbonizing the surface of the body thus formed; hardening the surface of the tubular blank by heating the same to a requisite temperature, then quenching in water or other suitable liquid, then tapping the bore and grinding the outside surface to form a hardened, polished perimeter.

In testimony whereof, we have hereunto set our hands at Los Angeles, California, this 3d day of October, 1927.

JESSE L. GRAY.
ROBERT W. GUNN.
WILLSIE A. S. THOMPSON.